United States Patent [19]

Mackereth

[11] Patent Number: 4,473,846
[45] Date of Patent: Sep. 25, 1984

[54] CLAMPING VIDEO SIGNALS

[75] Inventor: Thomas C. Mackereth, Cambridge, United Kingdom

[73] Assignee: U.S. Philips Corp., New York, N.Y.

[21] Appl. No.: 407,665

[22] Filed: Aug. 12, 1982

[30] Foreign Application Priority Data

Sep. 11, 1981 [GB] United Kingdom ............... 8127538

[51] Int. Cl.³ ............................................. H04N 5/18
[52] U.S. Cl. .................................................. 358/172
[58] Field of Search ................. 358/172, 34, 160, 166

[56] References Cited

U.S. PATENT DOCUMENTS

| | | | |
|---|---|---|---|
| 3,736,370 | 5/1973 | Thielking | 358/34 |
| 4,178,610 | 11/1979 | Constable et al. | 358/34 |
| 4,183,050 | 1/1980 | Tsuchiya et al. | 358/34 |
| 4,261,015 | 4/1981 | Dakroub | 358/172 |
| 4,415,929 | 11/1983 | Yoshisato | 358/172 |

Primary Examiner—Tommy P. Chin
Assistant Examiner—Michael D. Parker
Attorney, Agent, or Firm—Thomas A. Briody; William J. Streeter; Charles E. Quarton

[57] ABSTRACT

A video signal clamping circuit comprises a summing circuit (R1, R2, R9, 2) an analogue to digital converter (3), a programmable read only memory (6), a latch (7), a digital to analogue converter (9) and an integrator (11). The PROM (6) is addressed by the ADC(3) and produces a 4 bit output code which is dependent on the amplitude of the video signal. This is stored on the latch (7) and passed to the DAC(9) during a timing pulse applied to terminal (8) which occurs during the line blanking period. The DAC(9) produces an output which is stored on the capacitor (C1) in the integrator (11). The integrator (11) output is summed with the input video signal to clamp the video signal level to the reference voltage so that a clamped digital video signal is available from the output (5).

6 Claims, 1 Drawing Figure

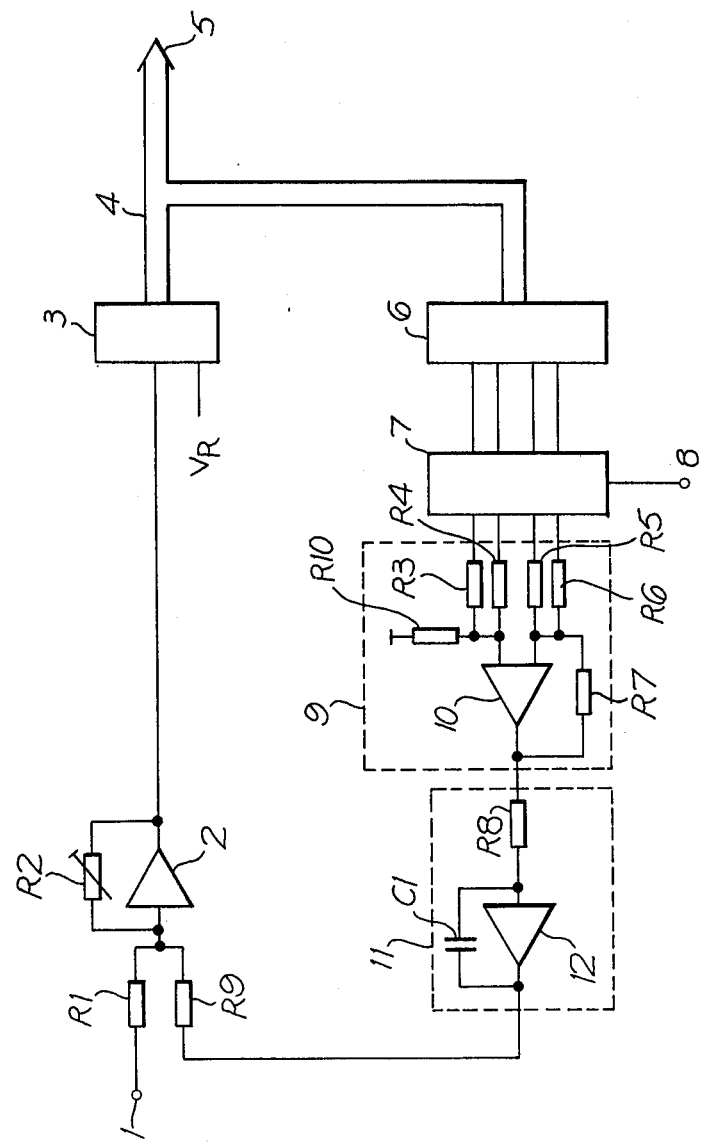

CLAMPING VIDEO SIGNALS

The invention relates to a circuit arrangement for clamping a video signal to a reference level comprising an input for receiving an analogue video signal and an output for delivering a digital video signal clamped to the reference level, an analogue to digital converter whose output is connected to the output of the circuit arrangement, means for applying a control signal to an integrating circuit, said control signal being dependent on the output of the analogue to digital converter, means for combining the received analogue video signal and the output of the integrating circuit and means for applying the combined signal to the input of the analogue to digital converter.

A circuit arrangement as described in the previous paragraph is disclosed in a paper entitled "Digital Processing Amplifier and Color Encoder" by Yoshizumi Eto, Kazuyuki Matsui, Shizuka Ishibashi and Hiroyuk Terui which was published in SMPTE Journal Volume 87 January 1978 pages 15 to 19. In the arrangement shown in FIG. 5 of that paper the means for applying the control signal to the integrating circuit comprises a NAND gate whose inputs are connected to respective outputs of the digital to analogue converter and whose output is connected to the D input of a D-type clocked bistable circuit. The output of the D-type bistable circuit forms the input signal to the integrator. The time constant of the integrator is chosen to be greater than the line period so that an integrated step during a line period is sufficiently smaller than the quantising step so that the blanking level is located at the centre between 0000 0000 and 0000 0001 for an eight bit analogue to digital converter and an eight input NAND gate.

It is an object of the invention to provide an alternative circuit arrangement for clamping a video signal to a reference level.

The invention provides a circuit arrangement as described in the opening paragraph characterised in that said means for applying a control signal to the integrating circuit comprises a programmed memory which is addressed by the output of the analogue to digital converter and which produces an output code dependent on the input address and a digital to analogue converter whose output provides said control signal. The arrangement according to the invention has the advantage that the amplitude signal applied to the inverter is dependent upon the difference between the actual and the desired blanking level and hence a faster correction may be achieved with large differences while still maintaining the precision of the setting. In addition both positive and negative voltages can be produced at the output of the integrator.

The programmed memory may comprise a programmable read only memory whose output may be connected to a register, the output of the memory being clocked into the register by a timing pulse which occurs within the blanking period of the video signal.

The digital to analogue converter may comprise a summing amplifier having a plurality of summing resistors each of which is connected between an individual output of the memory and the summing input of the amplifier. This provides a simple inexpensive arrangement for converting the digital output of the memory to an analogue signal for application to the integrating circuit.

The amplifier may be a differential amplifier, first and second resistors being connected between first and second outputs of the memory and the positive input of the differential amplifier, and third and fourth resistors being connected between third and fourth outputs of the memory and the negative input of the differential amplifier wherein the first and third resistors are substantially equal in value, the second and fourth resistors are substantially equal in value, and the ratio of the values of the first and second resistors is substantially equal to 3 to 1.

This enables an output in unit steps between −4 and +4 by selective switching of the resistors. This switching is accomplished by connecting one end of each resistor to the digital output of the memory either direct or via a register.

An embodiment of the invention will now be described, by way of example, with reference to the accompanying drawing the sole FIGURE of which is a schematic circuit diagram of a circuit arrangement according to the invention for clamping a video signal to a reference level.

The circuit arrangement shown in the FIGURE has an input terminal 1 which is connected via a resistor R1 to an input of an operational amplifier 2 whose output is connected to its input via a variable resistor R2. The output of amplifier 2 is also connected to the input of an analogue to digital converter 3 which produces an eight bit parallel output on an eight bit wide highway 4 by means of which it is connected to the output 5 of the circuit arrangement and to a programmed memory in the form of a programmable read only memory (PROM) 6. The memory 6 produces a four bit parallel output which is fed to a four bit register 7 which has a gating signal applied via a terminal 8. The outputs of register 7 are fed to a digital to analogue converter 9 which comprises four resistors R3 to R6, a differential amplifier 10 a resistor R10 connected between the junction of resistors R3 and R4 and a positive supply voltage and a further resistor R7 connected between the negative input of the differential amplifier 10 and its output. The output of the digital to analogue converter is connected to the input of an integrating circuit 11 which comprises a resistor R8, a capacitor C1 and an operational amplifier 12. The output of the integrating circuit 11 is fed to the input of amplifier 2 via a resistor R9.

In operation an analogue video signal which is not referred to a d.c. level is applied to input terminal 1 and is amplified by the amplifier 2 whose gain is set by the variable resistor R2. The amplified analogue video signal is then fed to the analogue to digital converter (ADC) 3 which produces an eight bit parallel digital video signal on the eight bit wide highway 4. The output of the ADC 3 is fed to the PROM to form an input address in response to which the PROM 6 produces a four bit parallel binary code at its output, the four bit code being fed to the four bit parallel register 7. The output of the register 7 is fed to the digital to analogue converter (DAC) 9 under the control of a gating pulse applied to terminal 8, the gating pulse occurring during the line blanking period. The output of the register 7 assumes the logic states of the output of the PROM 6 during the gating pulse only being zero at all other times. The DAC 9 produces an analogue voltage dependent on the code output from the PROM 3 which is fed to the integrating circuit 11. The output of the integrating circuit 11 is fed via the resistor R9 to the input of the amplifier 2 in which it is added to the input analogue video signal. In this way the analogue video signal at the output of amplifier 2 is clamped to a reference level during the line blanking period.

The PROM 3 is programmed according to table 1.

TABLE 1

| Input Address (decimal) | Output (binary) | | | | DAC voltage ratio |
|---|---|---|---|---|---|
| | R3 | R4 | R5 | R6 | |
| 256 | 0 | 0 | 1 | 1 | −4 |
| ↑ | | | | | |
| 22 | 0 | 0 | 1 | 1 | −4 |
| 21 | 0 | 0 | 0 | 1 | −3 |
| 20 | 0 | 0 | 0 | 1 | −3 |
| 19 | 1 | 0 | 0 | 1 | −2 |
| 18 | 1 | 0 | 0 | 1 | −2 |
| 17 | 0 | 0 | 1 | 0 | −1 |
| 16 | 0 | 0 | 0 | 0 | 0 |
| 15 | 1 | 0 | 0 | 0 | +1 |
| 14 | 0 | 1 | 1 | 0 | +2 |
| 13 | 0 | 1 | 1 | 0 | +2 |
| 12 | 0 | 1 | 0 | 0 | +3 |
| 11 | 0 | 1 | 0 | 0 | +3 |
| 10 | 1 | 1 | 0 | 0 | +4 |
| ↓ | | | | | |
| 0 | 1 | 1 | 0 | 0 | +4 |

The input addresses from 22 to 256 inclusive all give the output 0011 and the input addresses from 0 to 10 inclusive all give the output 1100.

Resistor R3 is selected to have a resistance value three times that of resistor R4. Similarly the resistance value of Resistor R5 is three times that of Resistor R6 and Resistors R3 and R5 are of equal value. By selecting these ratios for the resistors R3 to R6 the voltage at the output of the DAC9 can be adjusted to give the ratios 4,3,2,1,0,−1,−2,−3,−4. The integrator integrates the analogue voltage at the output of the DAC9 during the gating pulse applied to terminal 8 and stores this value on the capacitor C1. When the gating pulse terminates the output of DAC9 goes to zero and hence the voltage across resistor R8 is approximately zero and the discharge time of the integrator is consequently very much greater than the line period.

Various type of memory device may be used, for example a read-write random access memory could be used instead of the PROM 6. Alternatively if the quantities required are sufficient a mask programmed read only memory could be used. The size of the memory will depend on the resolution of the ADC 3.

Since the area of interest is that around the blanking level it would be possible to restrict the addressing inputs to the PROM to say the five least significant bits (giving 32 levels) and forcing the address to give maximum output from the PROM when any of the more significant bits are present. This could be achieved by means of OR gates between the output of the ADC3 and the address inputs of the PROM 6 and may enable a smaller memory to be used.

I claim:

1. A circuit arrangement for clamping a video signal to a reference level comprising an input for receiving an analogue video signal and an output for delivering a digital video signal clamped to the reference level, an analogue to digital converter whose output is connected to the output of the circuit arrangement, means for applying a control signal to an integrating circuit, said control signal being dependent on the output of the analogue to digital converter, means for combining the received analogue video signal and the output of the integrating circuit and means for applying the combined signal to the input of the analogue to digital converter, characterised in that said means for applying a control signal to the integrating circuit comprises a programmed memory which is addressed by the output of the analogue to digital converter and which produces an output code dependent on the input address and a digital to analogue converter whose output provides said control signal.

2. A circuit arrangement as claimed in claim 1, in which said programmed memory comprises a programmable read only memory.

3. A circuit arrangement as claimed in claims 1 or 2, in which the output of the memory is connected to a register, the output of the memory being clocked into the register by a timing pulse which occurs within the blanking period of the video signal.

4. A circuit arrangement as claimed in any of claims 1 or 2 in which the digital to analogue converter comprises a summing amplifier having a plurality of summing resistors each of which is connected between an individual output of the memory and the summing input of the amplifier.

5. A circuit arrangement as claimed in claim 4, in which the amplifier is a differential amplifier, first and second resistors are connected between first and second outputs of the memory and the positive input of the differential amplifier, and third and fourth resistors are connected between third and fourth outputs of the memory and the negative input of the differential amplifier wherein the first and third resistors are substantially equal in value, the second and fourth resistors are substantially equal in value, and the ratio of the values of the first and second resistors is substantially equal to 3 to 1.

6. A circuit arrangement as claimed in claim 1 in which the means for combining the received analogue video signal and the output of the integrating circuit comprises a summing amplifier.

* * * * *